G. F. YORK.
THREAD REMOVER.
APPLICATION FILED MAR. 9, 1920.
1,395,936.
Patented Nov. 1, 1921.
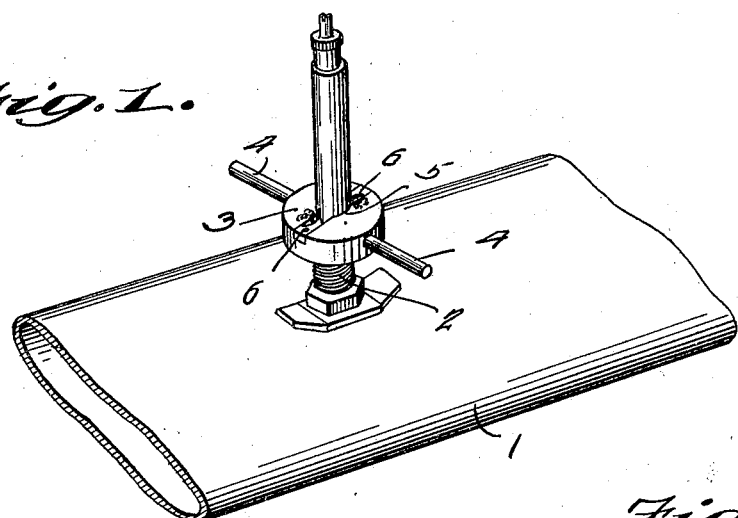
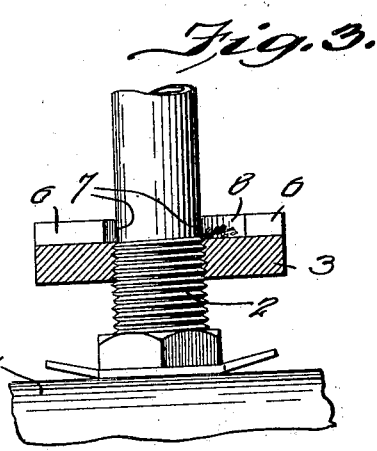
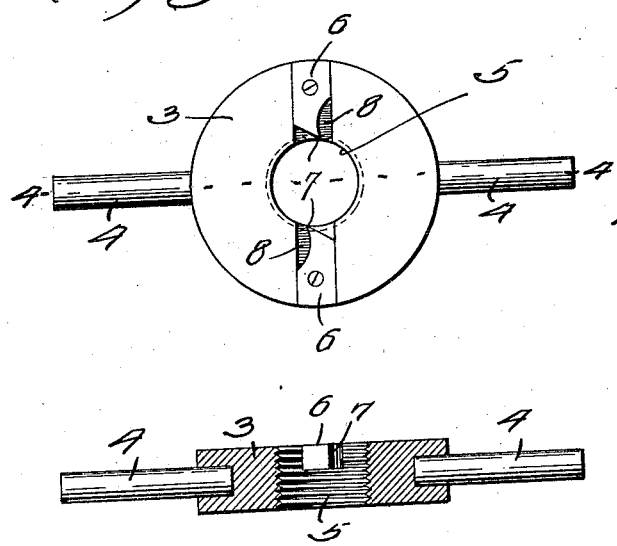
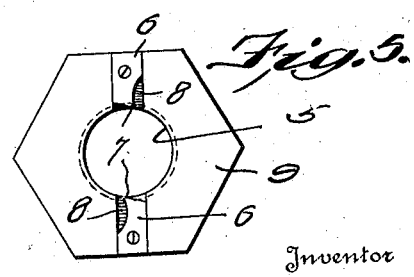
Inventor
Glenier F. York

UNITED STATES PATENT OFFICE.

GLENIER F. YORK, OF SALINA, KANSAS.

THREAD-REMOVER.

1,395,936.  Specification of Letters Patent.  Patented Nov. 1, 1921.

Application filed March 9, 1920. Serial No. 364,462.

*To all whom it may concern:*

Be it known that I, GLENIER F. YORK, a citizen of the United States, residing at Salina, in the county of Saline and State of Kansas, have invented a new and useful Thread-Remover, of which the following is a specification.

The object of my invention is to provide a device for removing, for a certain distance, the threads from a valve stem on the inner tube of a pneumatic tire, whereby to relieve the inconvenience of needless labor in removing the lock nut and dust cap when changing tires. I attain these and other objects of my invention by the mechanism shown in the accompanying drawings, in which—

Figure 1 is a perspective view of the device in use;

Fig. 2 is a top plan of the invention;

Fig. 3 is an enlarged transverse section of the device applied to a valve stem;

Fig. 4 is a transverse section of the device on line 4—4 of Fig. 2; and

Fig. 5 is a top plan of a modified form of the invention.

Referring to the accompanying drawings, I provide a suitable block 3, having a central opening 5 threaded to engage threads of the valve stem. Oppositely mounted on block 3 are suitably fixed cutter knives, having edges 7 of sufficient width to cut away and remove the threads of the valve stem when the device is applied to the stem and rotated. I may provide the arms 4 mounted in block 3 for rotating same, or I may provide an angular block 9 in lieu of the circular block 3 so that a wrench motion applied to the block will operate it in cutting off the threads of the valve stem. The phrase "means adapted to rotate the block" as hereinafter used, shall be construed to apply to either the arms 4 of a round block or the angular edges of an angular block. Cutters 6 are provided with suitable apertures for the escape of the chips. This invention is not a screw cutting device or die, but a novel cutting device for removing threads from a valve stem by applying the device to the valve stem and rotating it to the distance to which it is desired to remove the threads. This is done to save labor in removing and replacing of the tires by lessening the labor in removing and replacing a lock nut and dust cap.

The cutters 6 project slightly into the openings 5 of block 3 (or 9) to a plane in line with the annular plane of the edges of the threaded portion of the block as shown in Figs. 2, 3 and 5. This block is interiorly threaded to engage the threads of a valve screw merely as a guide and holder for the cutters 6.

What I claim is:

In a thread removing tool adapted for use on valves of automobile tires, the combination of a block, means for rotating the block, the block having a threaded opening therethrough, opposite cutting blades having cutting edges projecting inwardly to but not beyond the apex of the threads, the block having opposite grooves in which said cutters are affixed to the block, the cutters being shaped to leave slots for the escape of chips, the entire device being of suitable shape and size for operation on the valve stem of an automobile tire when same is mounted on the wheel.

GLENIER F. YORK.